(12) United States Patent
Sumizawa et al.

(10) Patent No.: US 7,725,254 B2
(45) Date of Patent: May 25, 2010

(54) NAVIGATION DEVICE USED FOR A ROUTE SEARCH

(75) Inventors: Akio Sumizawa, Sagamihara (JP); Yoshinori Endo, Mito (JP); Shinichi Amaya, Higashiyamato (JP); Taketo Tsuburaya, Sagamihara (JP)

(73) Assignee: Xanavi Informatics Corporation, Zama-shi (JP)

( * ) Notice: Subject to any disclaimer, the term of this patent is extended or adjusted under 35 U.S.C. 154(b) by 871 days.

(21) Appl. No.: 11/514,931

(22) Filed: Sep. 5, 2006

(65) Prior Publication Data
US 2007/0055443 A1    Mar. 8, 2007

(30) Foreign Application Priority Data
Sep. 5, 2005    (JP)    ............... 2005-256485

(51) Int. Cl.
*G01C 21/34* (2006.01)
(52) U.S. Cl. ..................................... 701/209
(58) Field of Classification Search ........................ None
See application file for complete search history.

(56) References Cited

U.S. PATENT DOCUMENTS

| | | | | |
|---|---|---|---|---|
| 5,752,217 A | * | 5/1998 | Ishizaki et al. | 701/201 |
| 5,862,509 A | * | 1/1999 | Desai et al. | 701/209 |
| 6,295,503 B1 | * | 9/2001 | Inoue et al. | 701/209 |
| 6,317,686 B1 | * | 11/2001 | Ran | 701/210 |
| 6,862,524 B1 | * | 3/2005 | Nagda et al. | 701/209 |
| 2001/0021895 A1 | | 9/2001 | Yamazaki | |
| 2003/0074131 A1 | * | 4/2003 | Barkowski et al. | 701/200 |
| 2004/0215389 A1 | * | 10/2004 | Hirose | 701/209 |
| 2005/0010360 A1 | * | 1/2005 | Nagase et al. | 701/210 |

FOREIGN PATENT DOCUMENTS

| | | |
|---|---|---|
| EP | 1 503 355 | 2/2005 |
| JP | 08-287393 | 11/1996 |
| JP | 9-113290 | 5/1997 |
| JP | 2002-310698 | * 10/2002 |

* cited by examiner

*Primary Examiner*—Michael J. Zanelli
(74) *Attorney, Agent, or Firm*—Antonelli, Terry, Stout & Kraus, LLP.

(57) ABSTRACT

Route search is performed considering the fact that traffic conditions differ according to lane even for the same road. A navigation device performs route search, using link costs (link travel times) classified by lane. For example, the navigation device searches for a route having the lowest total cost to the destination, using link data that determine cost for each lane of a component link of a road on a map. A cost of a lane on which a vehicle runs to move to a next link, being the cost of any lane of the link, is used as a cost of a link on a route.

8 Claims, 10 Drawing Sheets

LANE INFORMATION 3125

| LANE (31251) | CONNECTION LINK ID (31252) |
|---|---|
| RIGHT TURN LANE | ** |
| LEFT TURN LANE | ** |
| STRAIGHT THROUGH LANE | ** |
| ⋮ | ⋮ |

FIG. 3

LANE INFORMATION 3125

| LANE | CONNECTION LINK ID |
|---|---|
| RIGHT TURN LANE | ** |
| LEFT TURN LANE | ** |
| STRAIGHT THROUGH LANE | ** |
| ┆ | ┆ |

LINK TRAVEL TIME 3225

| LANE | LINK TRAVEL TIME BY LANE |
|---|---|
| RIGHT TURN LANE | ** |
| LEFT TURN LANE | ** |
| STRAIGHT THROUGH LANE | ** |
| ⋮ | ⋮ |

| DATE | COLLECTION CONDITION A (DAY TYPE) |
|---|---|
| 2002/11/28 | ORDINARY DAY (GENERAL) |
| 2002/11/29 | ORDINARY DAY (BEFORE HOLIDAY) |
| 2002/11/30 | HOLIDAY (GENERAL) |
| 2002/12/01 | HOLIDAY (GENERAL) |
| 2002/12/02 | ORDINARY DAY (AFTER HOLIDAY) |
| 2002/12/03 | ORDINARY DAY (GENERAL) |
| ⋮ | ⋮ |

HEAP TABLE 420

| LINK ID | CONNECTION SOURCE LINK ID | TOTAL TRAVEL TIME UP TO THE START NODE (C1 + C2) | TRAVEL TIME BY LANE | TOTAL TRAVEL TIME | FLAG |
|---|---|---|---|---|---|
| ** | ** | ** | RIGHT TURN LANE:** | ** | OFF |
|  |  |  | MIDDLE LANE:** | ** | OFF |
|  |  |  | LEFT TURN LANE:** | ** | ON |
| ** | ** | ** | RIGHT TURN LANE:** | ** | ON |
|  |  |  | MIDDLE LANE:** | ** | ON |
| ------- | ------- | ------- | ------- | ------- | ------- |

421 422 423 424 425 426

427: FLAG columns

C1: TOTAL TRAVEL TIME UP TO THE START NODE OF THE EXTRACTED LINK
C2: TRAVEL TIME OF THE LANE OF THE EXTRACTED LINK LEADING TO A CANDIDATE LINK

NAVIGATION DEVICE USED FOR A ROUTE SEARCH

BACKGROUND OF THE INVENTION

The present invention relates to a navigation device, and particularly to a route search technique for a car-mounted navigation device.

Patent Document 1 describes a car-mounted navigation device that uses respective costs (travel times) of links constituting a road and searches for a route having the lowest cost to reach a destination.

Patent Document 1: Japanese Non-examined Patent Laid-Open No. H08-287393

Some roads have a plurality of lanes in the same direction. For example, in the case where there are a right turn lane and a straight through lane, travel times may be very different depending on the lane, due to the right turn lane being jammed while traffic in the straight through lane moves smoothly. The technique of Patent Document 1 does not take this into consideration.

An object of the present invention is to perform route search considering difference in traffic conditions between lanes.

SUMMARY OF THE INVENTION

To solve the above problem, a navigation device of the present invention performs route search using link costs classified according to lane.

For example, a navigation device according to the present invention comprises: a storage means, which stores link data including cost (for example, travel times) of respective lanes of links constituting a road on a map; and a route search means, which searches for a route having a lowest total cost to a destination, using the link data. As a cost of each link constituting a route, the above-mentioned route search means may use cost of a lane on which a vehicle runs to move to a next link (for example, a right turn lane when the next link follows a right turn), among costs of lanes of the link in question.

Further, the navigation device may comprise: a means, which stores link data including cost of respective lanes of links constituting a road on a map, the costs being statistically processed based on traffic information collected in the past and classified according to collection conditions; and a route search means, which searches for a route having a lowest total cost to a destination, using the link data. As a cost of each link constituting a route, the above-mentioned route search means may use cost of a lane on which a vehicle runs to move to a link next to the link in question, among costs classified according to collection conditions corresponding to a situation at a time of arrival at the link in question.

Further, the navigation device may comprise: a means, which stores link data including travel times of respective lanes of links constituting a road on a map; a route search means, which searches for a route to a destination; and a travel time calculation means, which calculates a total travel time to the destination, by adding respective travel times of links constituting a route to the destination. As a travel time of each link constituting a route, the above-mentioned travel time calculation means may use travel time of a lane on which a vehicle runs to move to a next link, among travel times of lanes of the link in question.

BRIEF DESCRIPTION OF THE DRAWINGS

FIG. 3 is a diagram showing a configuration of lane information in link data;

FIG. 5 is a diagram showing a configuration of link travel time information in the statistical traffic data;

FIG. 6 is a diagram showing a configuration of a date conversion table used for specifying the day type based on a date;

FIG. 10 is a diagram showing a configuration of a heap table used for the route search processing.

DETAILED DESCRIPTION

Figure 1:
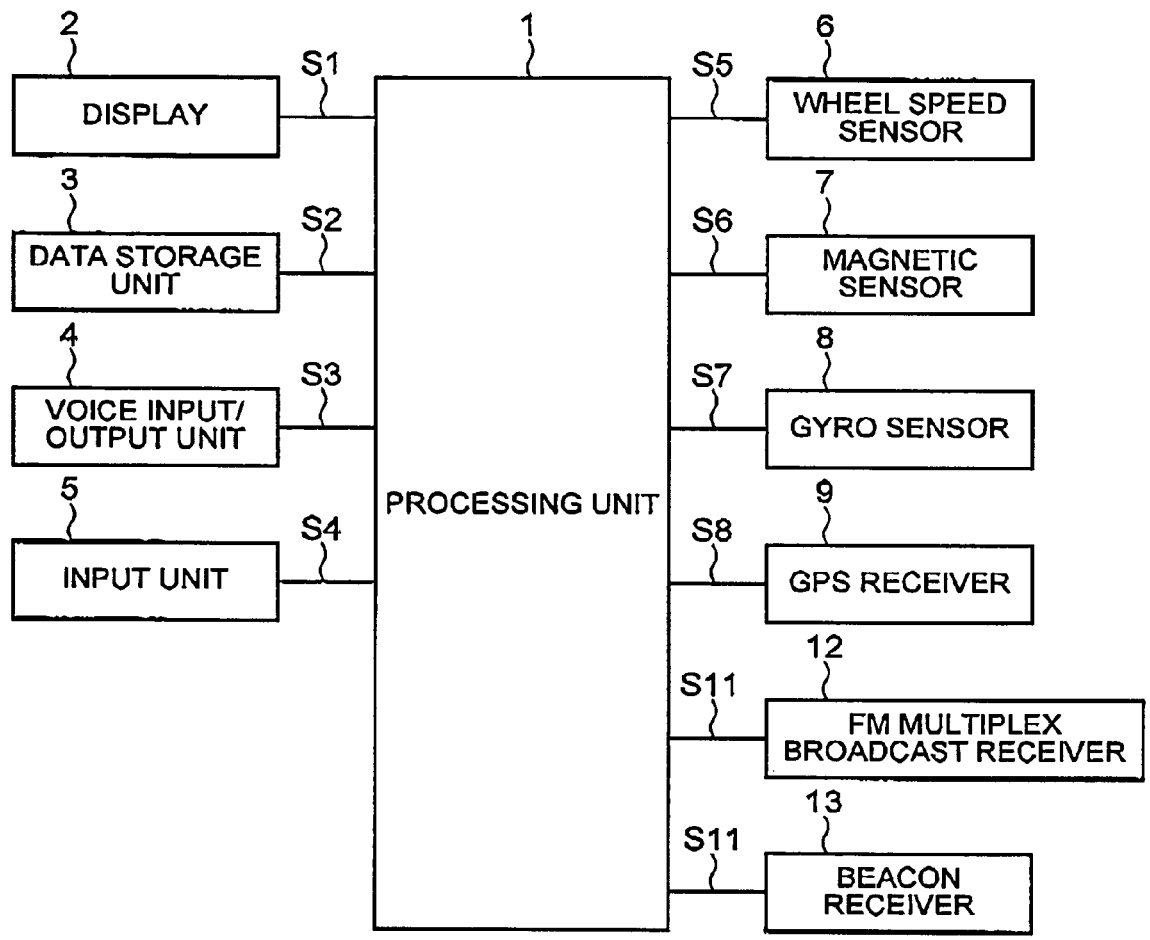
FIG. 1 is a schematic block diagram showing a car-mounted navigation device 1000.

One embodiment of the present invention will be described below, referring to the drawings.

FIG. 1 is a schematic block diagram showing a car-mounted navigation device 1000 according to one embodiment of the present invention. As shown in the figure, the car-mounted navigation device 1000 of the present embodiment comprises: a processing unit 1; a display 2; a data storage unit 3; a voice input/output unit 4; an input unit 5; a wheel speed sensor 6; a magnetic sensor 7; a gyro sensor 8; a Global Positioning System (GPS) receiver 9; an FM multiplex broadcast receiver 12; and a beacon receiver 13.

The processing unit 1 is a central unit that performs various kinds of processing. For example, the processing unit 1 detects the present location based on pieces of information outputted from various sensors 6 to 8 and the GPS receiver 9. Further, the processing unit 1 reads map data required for display from the data storage unit 3 based on the obtained present location information. Furthermore, the processing unit 1 expands the read map data into a graphic, superimposes a mark indicating the present location upon the graphic, and displays the resultant graphic on the display 2. Further, using map data and statistical traffic data stored in the data storage unit 3, the processing unit 1 searches for the best route (recommended route) connecting the destination designated by a user and the present location (the departure point). Moreover, the processing unit 1 guides the user through the voice input/output unit 4 and the display 2.

The display 2 is a unit that displays graphics information generated by the processing unit 1. The display 2 comprises a CRT or a liquid crystal display. Generally, a signal S1 that connects the processing unit 1 and the display 2 is an RGB signal or a National Television System Committee (NTSC) signal.

The data storage unit 3 comprises a storage medium such as a CD-ROM, a DVD-ROM, an HDD or an IC card. This storage medium stores the map data 310, the statistical traffic data 320, and the like.

Figure 2:
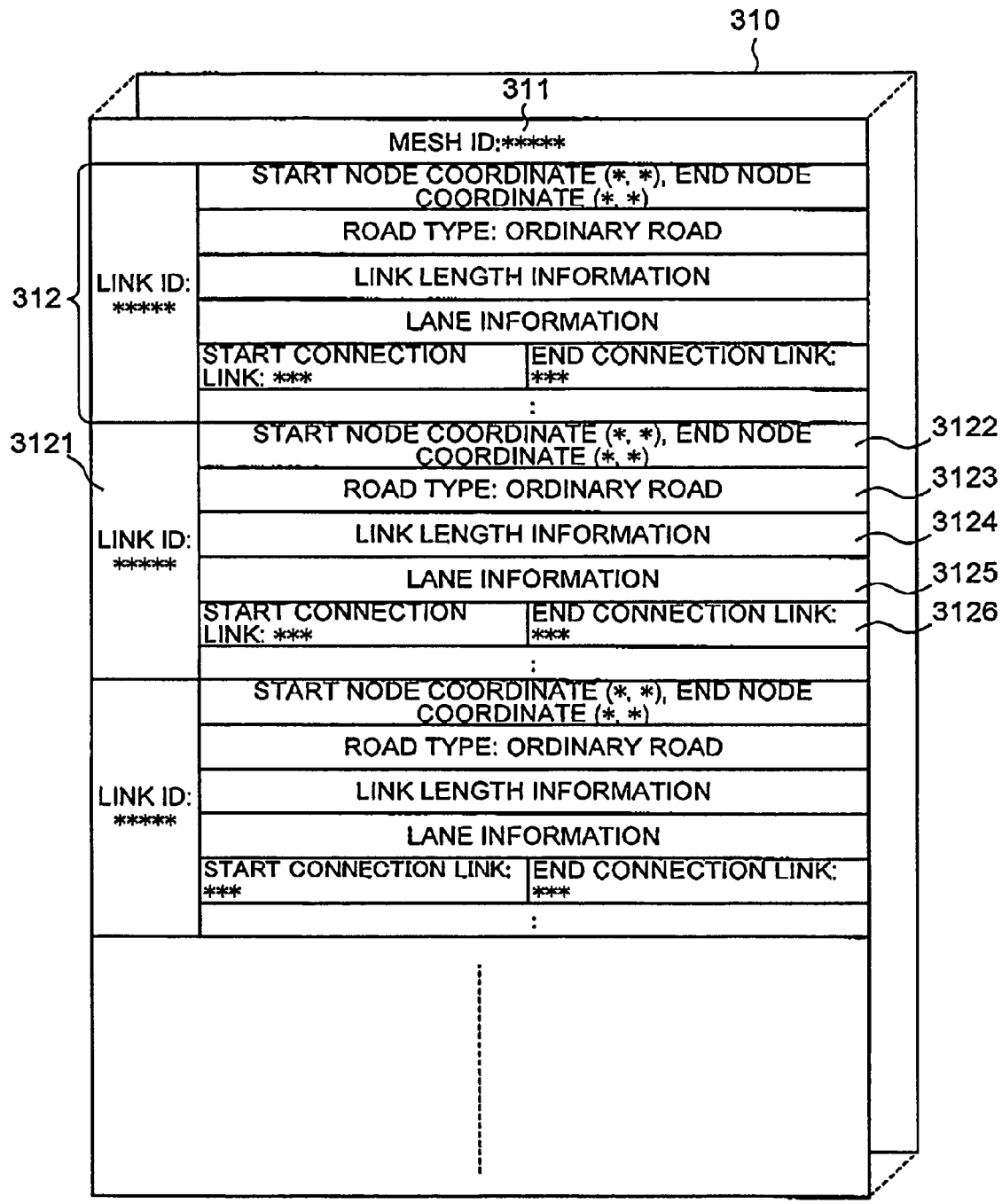
FIG. 2 is a diagram showing a configuration of map data stored in a data storage unit 3.

FIG. 2 is a diagram showing a configuration of the map data 310. For each identification code (mesh ID) 311 of a mesh area (which is a demarcated area of a map), the map data 310 includes link data 312 of respective links constituting roads included in that mesh area.

For each link identification code (link ID) 3121, the link data 312 includes: coordinate information 3122 of two nodes (a start node and an end node) constituting the link; type information 3123 of a road that includes the link; link length information 3124 that indicates the length of the link; information on lanes (lane information) 3125 in cases of a plurality of lanes; link IDs (i.e. connecting link IDs) 3126 of links that are respectively connected to the two nodes; and the like. Here, two nodes constituting a link are differentiated as a start node and an end node so that the up direction and the down direction of the same road are managed as links that are different from each other.

FIG. 3 is a diagram showing a configuration of the lane information 3125. The lane information 3125 includes a link ID 31252 of links (connection links) composing a road on which a vehicle will run after running on the lane 31251, for each lane 31251, such as a right turn lane, a left turn lane, a straight through lane, and the like. For example, with respect to a right turn lane, the lane information 3125 stores a link ID of a link (a component of a road) on which a vehicle will run after turning right. Here, types of lanes are not limited to right and left turn lanes and a straight through lane located before a branch. When a straight road has an ordinary lane, a passing lane and the like, the lane information 3125 stores information on these lane types 31251 and their respective connection links 31252. Sometimes, the number of lanes changes in mid-course of a road. In the present embodiment, a point at which the number of lanes changes is taken as a node, and links before and after the node are taken as different links.

Each piece of map data 310 also includes information (such as names, types, and coordinate information) on map elements other than roads included in the corresponding mesh area.

Figure 4:
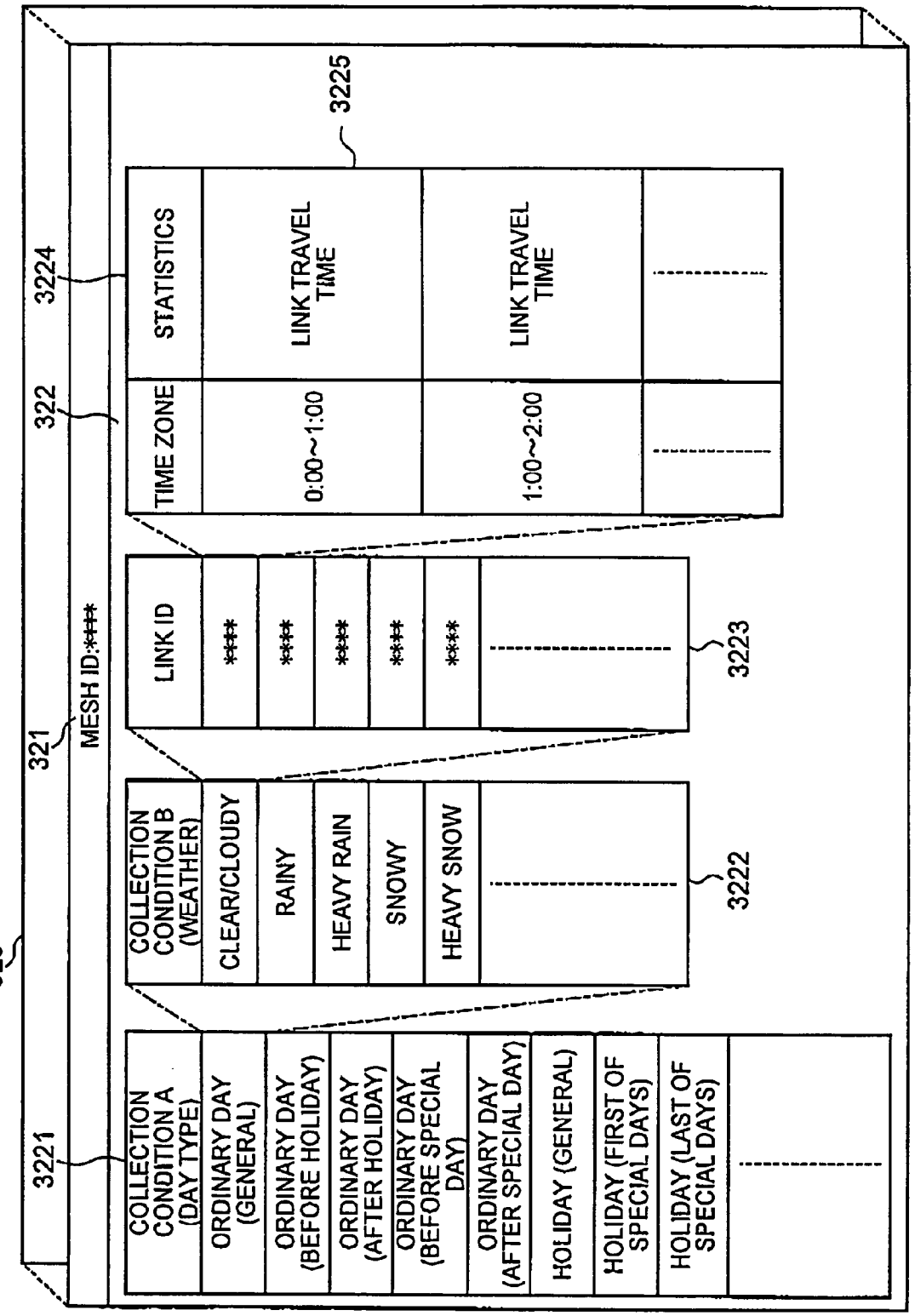
FIG. 4 is a diagram showing a configuration of statistical traffic data.

FIG. 4 is a diagram showing a configuration of the statistical traffic data 320. Each piece of statistical traffic data 320 includes: a mesh ID 321 of a mesh area; and traffic information statistical data (traffic information statistics collected in the past) 322 for each of links constituting the roads included in the mesh area. The mesh IDs 321 used here are same as the mesh IDs 311 in the map data 310. The traffic information statistical data 322 include traffic information statistics 3224 classified according to collection conditions 3221 and 3222 and link ID 3223. The same link ID 3121 in the map data 310 is used as a link ID 3223 of each link.

The collection conditions are a day type 3221 and a weather type 3222. A day type is defined for each class in which traffic information statistics 3224 have a tendency that is different from the other classes. Day types 322 may include: an ordinary day just before a holiday, "ordinary day (before holiday)"; an ordinary day just after a holiday, "ordinary day (after holiday)"; an ordinary day just before a special day such as Festival of the Dead or New Year's Day, "ordinary day (before special day)"; an ordinary day just after a special day, "ordinary day (after special day)"; other ordinary day, "ordinary day (general)"; the first day of some special days, "holiday (first of special days)"; the last day of some special days, "holiday (last of special days)"; other holiday, "holiday (general)"; or the like.

Weather type 3222 in the collection conditions is defined for each class in which traffic information statistics 3224 have a tendency that is different from the other classes. "Clear/Cloudy", "Rainy", "Heavy Rain", "Snowy", "Heavy Snow", or the like may be mentioned as weather types 3222.

The traffic information statistics 3224 include a link travel time 3225 obtained by statistical processing for each time period. FIG. 5 is a diagram showing a configuration of the link travel time 3225. The link travel time 3225 stores a link travel time for lane 32252 corresponding to each lane 32251.

The above-mentioned traffic information statistics 3224 are obtained by statistical processing based on pieces of traffic information collected in the past.

Thus, the traffic information statistics 3224 are classified according to the collection conditions of traffic information as the basis of those statistics (i.e. day type 3221 and weather type 3222 of a day on which the traffic information was collected as the basis of those statistics) and target link 3223. In other words, when a day type 3221, a weather type 3222, a link ID 3223 and a time period are determined, it is possible to extract the link travel time 3325 (i.e. respective link travel times corresponding to lanes) obtained by the statistical processing.

The data storage unit 3 further stores a date conversion table, i.e. a conversion table used for converting a date into a day type registered in a day type list 3221. FIG. 6 is a diagram showing an example of a configuration of the date conversion table. As shown in the figure, a date 331 and a day type 332 corresponding to that date 331 are coupled and registered. Using such a date conversion table, it is possible to specify a day type easily from a date.

Returning to FIG. 1, the description is continued. The voice input/output unit 4 converts a message to the user (which has been generated by the processing unit 1) into a voice signal and outputs the voice signal. In addition, the voice input/output unit 4 recognizes voice of the user and transfers the contents of the voice to the processing unit 1.

The input unit 5 is a unit for receiving an instruction from the user. The input unit 5 comprises hard switches such as scroll keys and a scale key, a joystick, a touch panel stuck on a display panel, and the like.

The sensors 6 to 8 and the GPS receiver 9 are used in the car-mounted navigation device 100 for detecting the present location (i.e. the location of the vehicle that is equipped with the navigation device in question). The wheel speed sensor 6 measures a distance based on the product of the circumference of the wheel and the measured number of revolutions of the wheel, and further measures an angle of a turn of the moving body based on a difference between the numbers of revolutions of a pair of wheels. The magnetic sensor 7 detects the magnetic field of the earth to detect the direction in which the moving body faces. The gyro 8 comprises fiber optic gyros, vibrating structure gyros and the like, and detects an angle of rotation of the moving body. The GPS receiver 9 receives signals from GPS satellites, and measures distances and rates of change of distance between the moving body and three or more GPS satellites to detect the present location, the rate of progress and the traveling direction of the moving body.

The FM multiplex broadcast receiver 10 receives summarized current traffic data, traffic restriction information, and weather information sent as FM multiplex broadcast signals from FM multiplex broadcasting stations.

The beacon receiver 13 receives current traffic data including link travel times sent from beacons.

Figure 7:
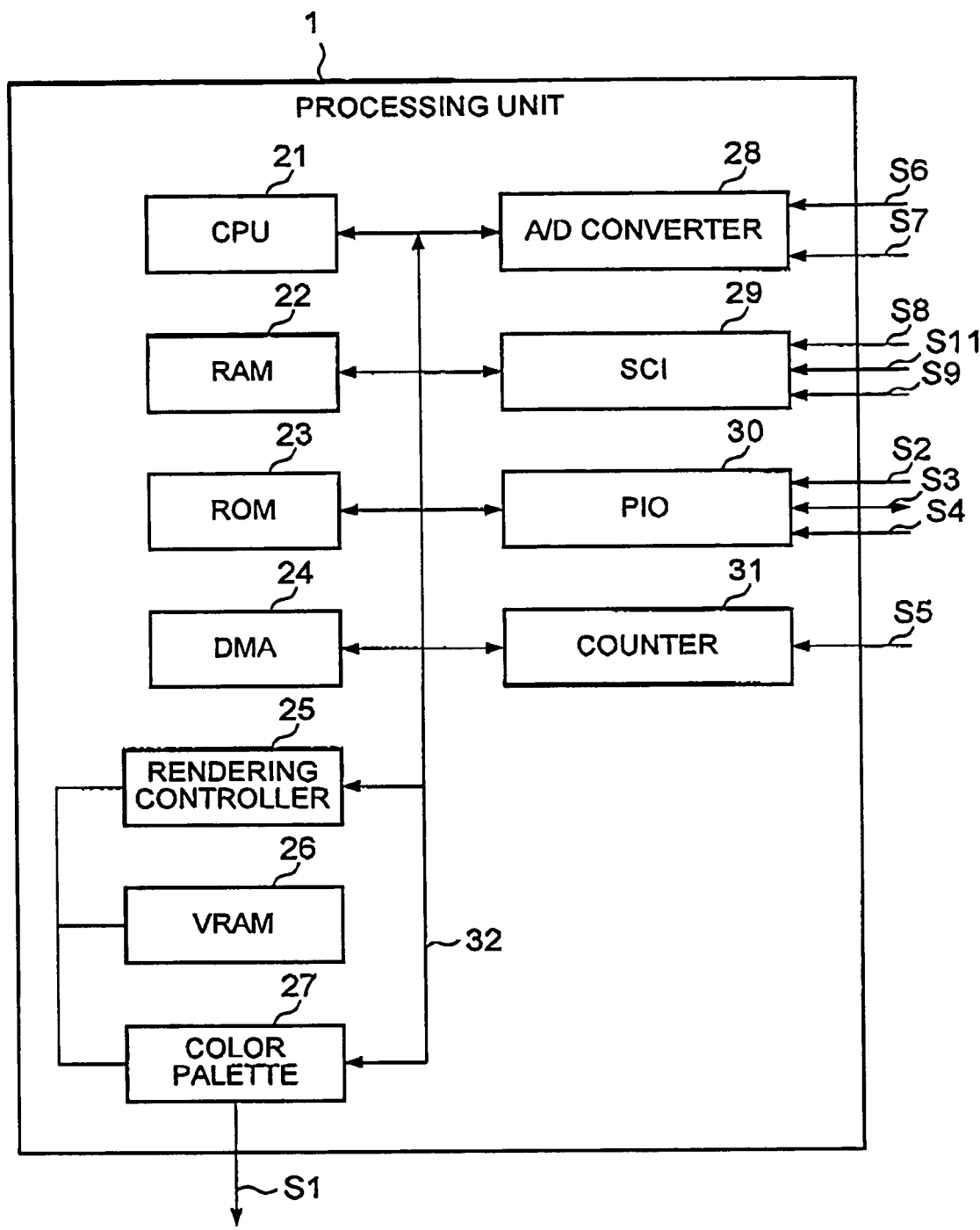
FIG. 7 is a diagram showing a hardware configuration of a processing unit 1.

FIG. 7 is a diagram showing a hardware configuration of the processing unit 1.

As shown in the figure, the processing unit 1 is constructed by connecting various devices by a bus 32. The processing unit comprises: a Central Processing Unit (CPU) 21 for executing various processes such as numerical operation and control of various devices; a Random Access Memory (RAM) 22 for storing map data, statistical traffic data, operation data and the like, read from the data storage unit 3; a Read Only Memory (ROM) 23 for storing programs and data; a Direct Memory Access (DMA) 24 for executing data transfer between the memories and between a memory and a device; a rendering controller 25 for executing graphics rendering and display control; a Video Random Access Memory (VRAM) 26 for buffering graphics image data; a color palette 27 for converting image data into an RGB signal; an A/D converter 28 for converting an analog signal into a digital signal; a Serial Communication Interface (SCI) 29 for converting a serial signal into a parallel signal synchronized with the bus; a Parallel Input/Output (PIO) 30 for putting a parallel signal onto and synchronously with the bus; and a counter 31 for integrating a pulse signal.

Figure 8:
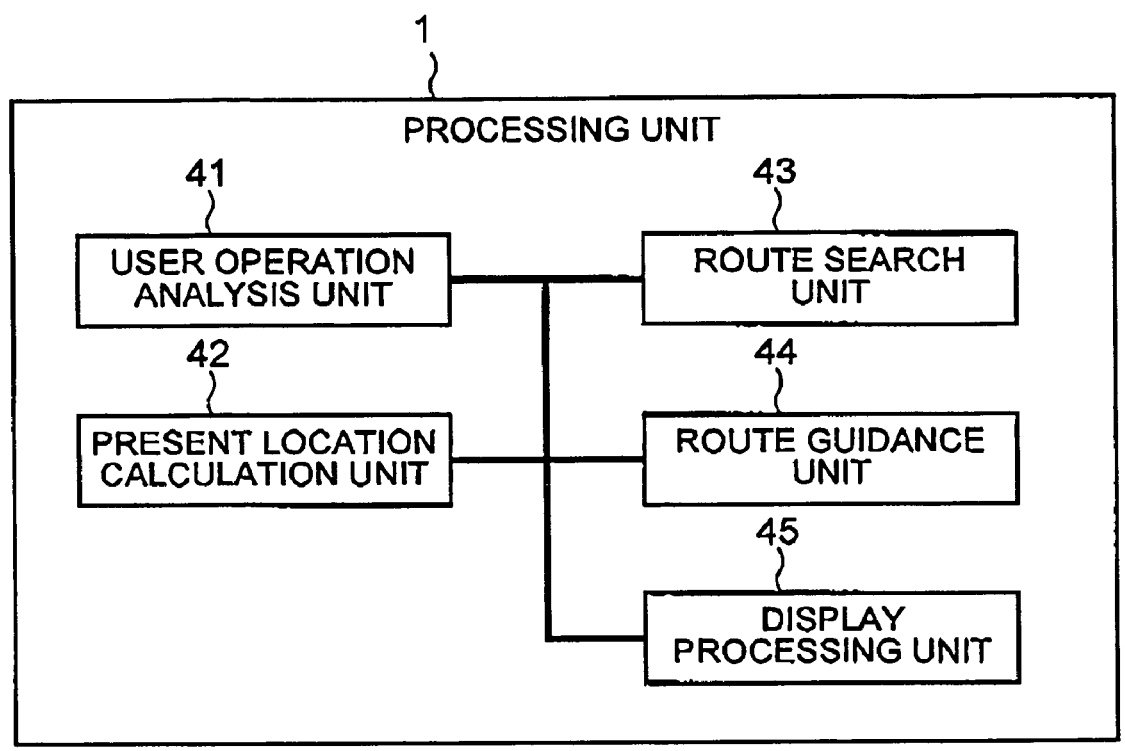
FIG. 8 is a diagram showing a functional configuration of the processing unit 1.

FIG. 8 is a diagram showing a functional configuration of the processing unit 1.

As shown in the figure, the processing unit 1 comprises: a user operation analysis unit 41; a present location calculation unit 42; a route search unit 43; a route guidance unit 44; and a display processing unit 45.

The user operation analysis unit 41 receives a request inputted by the user through the input unit 5, analyzes the content of the request, and controls various component units of the processing unit 1 to perform processing corresponding to the content of the request. For example, when the user requests a search for a recommendation route, the user operation analysis unit 41 requests the display processing unit 45 to display a map on the display 2 for setting a destination. Further, the user operation analysis unit 41 requests the route search unit 43 to calculate a route from the present location (the departure point) to the destination.

The present location calculation unit 42 periodically calculates the present location (X', Y'), i.e. the location of the vehicle traveling from the initial location (X, Y), by integrating distance data and angle data progressively along the time axis. Here, the distance data and the angle data are obtained by integrating distance pulse data S5 measured by the wheel speed sensor 6 and angular acceleration data S7 measured by the gyro 8. Further, the present location calculation unit 44 uses the calculation results to perform map matching, so that the present location is incorporated onto the road (link) whose shape has the highest correlation. Further, the present location calculation unit 44 periodically corrects the present location to a present location obtained from an output value of the GPS receiver 9.

The route search unit 43 employs, for example, Dijkstra's algorithm for searching for a route connecting the two designated points (i.e. the present location and the destination) so that the cost (such as the travel time) of the route becomes smallest.

The route guidance unit 44 performs route guidance using the route retrieved by the route search unit 43. For example, the route guidance unit 44 compares the information on the route with the information on the present location and gives the user voice advice to go straight, to turn right or to turn left before passing an intersection. through the voice input/output unit 4. Further, the route guidance unit 44 displays the traveling direction on the map displayed on the display 2 so that the recommended route is known to the user.

The display processing unit 44 receives map data corresponding to an area whose display on the display 2 is requested, from the data storage unit 3. Then, the display processing unit 46 generates map rendering commands in order to render roads, other map elements, marks such as those indicating the present location and the destination and arrows indicating the guided route, on a designated scale and by a designated rendering method. Further, on receiving an instruction outputted from the user operation analysis unit 41, the display processing unit 46 receives statistical traffic data, which are requested to be displayed on the display 2, from the data storage unit 3, and generates map rendering commands in order to superimpose traffic information of each road on the map displayed on the display 2. Then, the generated commands are sent to the display 2.

[Description of Operation]

Figure 9:
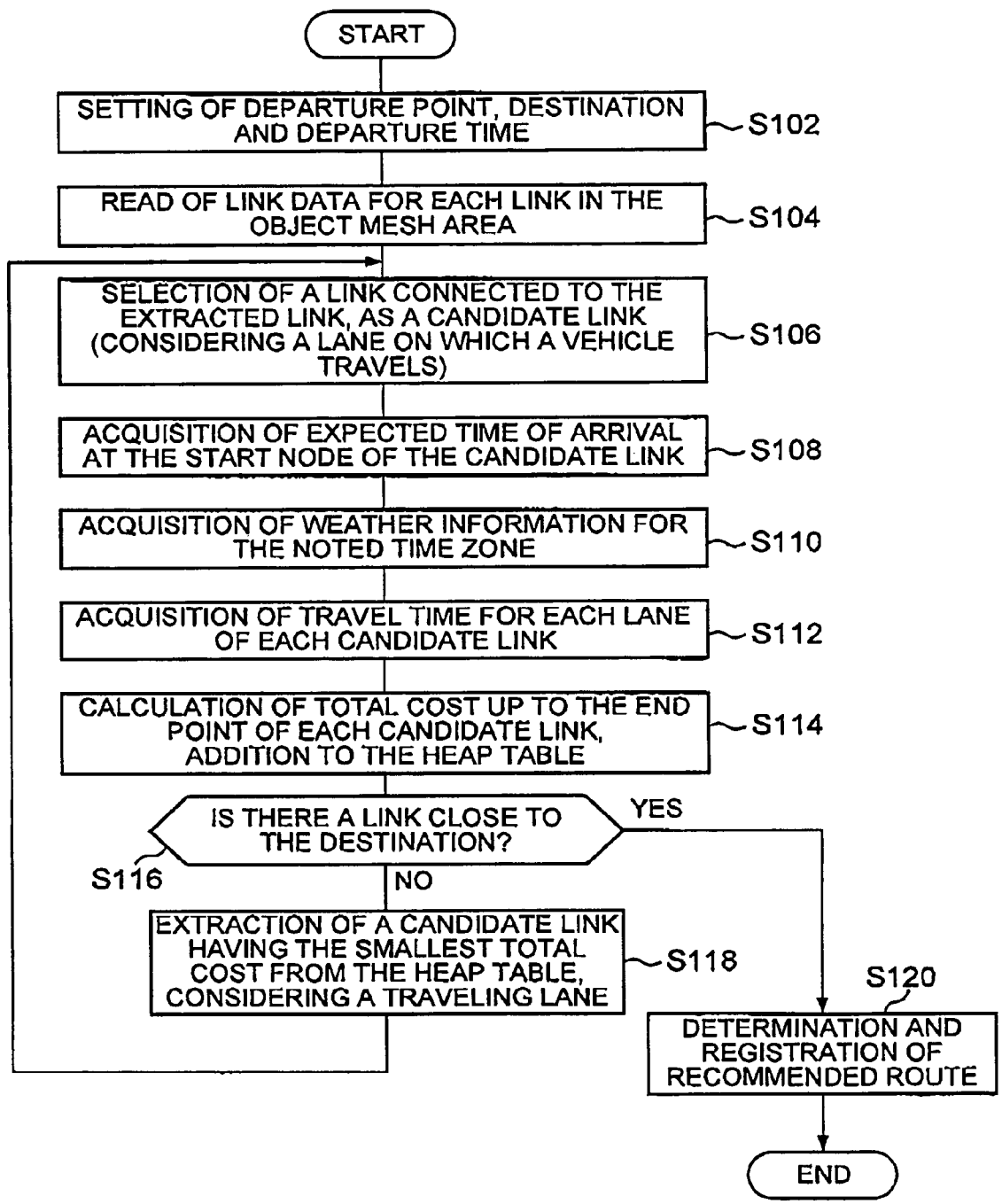
FIG. 9 is a flowchart showing an outline of route search processing of the car-mounted navigation device 1000.

Next, operation of the car-mounted navigation device 1000 will be described. FIG. 9 is a flowchart showing an outline of operation of the car-mounted navigation device 1000 of the present embodiment.

This flow is started when the user operation analysis unit 41 receives a request for searching for a route to be recommended, from the user through the voice input/output unit 4 or the input unit 5.

First, the user operation analysis unit 41 sets a departure point. Usually, the user operation analysis unit 41 sets the present location as a departure point. The present location is obtained by the present location calculation unit 42. Further, the user operation analysis unit 41 sets a destination according to an instruction of the user. For example, the user operation analysis unit 41 reads the map elements registered in the map data from the data storage unit 3. Then, the user operation analysis unit 41 displays these map elements on the display 2 through the display processing unit 45. The user operation analysis unit 41 allows the user to select a destination from the displayed information of the map elements through the input unit 5. Further, the user operation analysis unit 41 sets a departure time. In cases where the present time is set as the departure time, the present time obtained by means of a built-in timer (not shown) at the time of receiving the request for searching a route to be recommended is set as the departure time (S102).

Next, based on the coordinates of the present location, the route search unit 43 specifies a mesh ID of each mesh area included in a route search area containing the departure point and the destination. Further, for each of the specified mesh IDs, the route search unit 43 obtains link data 312 registered in map data 310 having the specified mesh ID in question, from the data storage unit 3. Further, the route search unit 43 reads the date conversion table from the data storage unit 3. Then, using the date conversion table, the route search unit 43 specifies the day type of the departure date. In cases where the departure date is not registered in the date conversion table, the route search unit 43 specifies a day type of the departure date by means of computational logic. The processing of specifying a day type corresponding to the departure date may be executed by software built in the car-mounted navigation device 1000. This allows continuation of the processing even when the departure date is beyond the range of dates registered in the date conversion table (S104).

Next, using each piece of link data 312 obtained in S104, the route search unit 43 selects a link whose start node is the end node of the extracted link extracted in the step S118 described below, from a heap table 420. The selected link is a candidate link for a component of a recommended route.

FIG. 10 shows a configuration of the heap table 420. For each link ID 421, the heap table 420 stores a record 427 including: a connection source link ID 422; a total travel time up to the start node of the link 423; a travel time of the link by lane 424; a total travel time up to the end node of the link by lane 425; and a flag 426 indicating whether the link has been already extracted or not.

The route search unit 43 refers to the lane information 3125 and selects, as a candidate link, a link connected to the lane specified in S118. In other words, when a right turn lane has been specified in S118, then the route search unit 43 selects the connection link 31252 corresponding to the right lane 31251. When a left turn lane has been specified, then the route search unit 43 selects the connection link 31252 corresponding to the left turn lane 31251. When a straight through lane has been specified, then the route search unit 43 selects the connection link 31252 corresponding to the straight through lane 31251.

Here, in cases where the processing of S118 has not been performed yet, i.e. at an initial stage where no link has been registered in the heap table 420, at least one link on which the departure point exists or at least one link close to the departure point is selected as a candidate link, instead of selecting a link whose start node is the end node of an extracted link (S106).

Next, the route search unit 43 calculates an expected time of arrival at the start node of the candidate link according to the following equation.

(Expected time of arrival at the start node of the candidate link) =(Departure time)+($C1$)+($C2$)

where $C1$: the total travel time up to the start node of the extracted link $C2$: the travel time of an extracted link's lane connected to the candidate link The total travel time $C1$ up to the start node of the extracted link is obtained by searching the heap table 420 for the total travel time 423 up to the start node of a link having the same link ID 421 as the link ID of the extracted link.

The travel time $C2$ of the extracted link's lane connected to the candidate link can be obtained as follows. First, the route search unit 43 adds the total travel time $C1$ up to the start node of the extracted link, to the departure time, to obtain an expected time of arrival at the start node of the extracted link. Then, the route search unit 43 obtains weather at the expected time of arrival at the start node of the extracted link, through the FM multiplex broadcast receiver 12. Further, the route search unit 43 obtains the link travel times of the link in the obtained weather at the expected arrival time, from the statistical traffic data 322. From the lane information 3125 of the extracted link, the lane 31251, for which a connection link ID 31252 is a candidate link ID, is specified. From the link travel time 3225 among the obtained statistical traffic data 322, the travel time 32252, corresponding to the specified lane 31251 (32251), is retrieved. The retrieved travel time 32252 is determined as the travel time $C2$ of the extracted link's lane connected to the candidate link (S108).

Next, the route search unit 43 specifies a mesh ID of a mesh area in which the end node of the extracted link is located, based on the coordinates of the end node. Here, in the case where the processing of S118 has not been performed yet, i.e. in the case of the initial stage where no link has been registered in the heap table 420, the route search unit 43 specifies a mesh ID of a mesh area in which the departure point is located. Then, the route search unit 43 obtains weather information corresponding to the specified mesh ID and the time period (referred to as the noted time period) to which the expected time of arrival at the start node of the candidate link belongs, through the FM multiplex broadcast receiver 12 (S108).

Next, the route search unit 43 accesses the statistical traffic data 320 having the mesh ID specified in S104, which are stored in the data storage unit 3. Then, using the statistical traffic data 320, the route search unit 43 obtains traffic information statistics 3224 that are statistics of the noted time period and associated with the day type specified in S104 and the weather type specified by the weather information obtained in S106, with respect to the candidate link. Then, the route search unit 43 obtains the link travel time 3225 included in the traffic information statistics 3224 (S110).

Next, the route search unit 43 calculates the total travel time 425 from the departure point to the end node of the candidate link. In detail, the route search unit 43 adds the travel time (obtained in S110) of the candidate link to the total travel time 423 (registered in the heap table 420) up to the start node of the candidate link. At this time, in the case where there is a plurality of lanes, a travel time for each lane is added to obtain the total travel time 425 for that lane. However, in the initial stage where no extracted link has been registered in the heap table 420, the travel time of the candidate link, which has been calculated in S110, is taken as the total travel time 425 up to the candidate link in question. Then, as shown in FIG. 10, the route search unit 43 adds, to the heap table 420, a record 427 that stores the link ID 421 of the candidate link, the link ID 422 of the connection source link (i.e. the link ID of the extracted link), the total travel time 423 up to the start node, the respective link travel times 424 of the lanes, the respective total travel times 425 of the lanes up to the end node, and the respective flags 426 indicating whether the lanes have been selected each as an extracted link (S114).

Next, the route search unit 43 judges whether there is a link (a destination link) on which the destination is located among links newly added to the heap table 420 (S116).

When it is judged that a destination link does not exist (No in S116), then the route search unit 43 extracts a link that has not been extracted yet and has the smallest total travel time 425 from the heap table 420. In detail, the route search unit 43 examines respective flags 426 given to the lanes of each link, and specifies a link's lane whose total travel time 425 is smallest among the lanes having flags indicating that those lanes have not been extracted yet. The route search unit 43 then sets the link in which the specified lane exists, as a extracted link, and returns to S106 (S118).

On the other hand, when it is judged that a destination link exists (Yes in S116), then the route search unit 43 performs recommended route determination processing. In detail, the route search unit 43 searches the heap table 420 for a link (a connection source link) that has caused the destination link, and determines the retrieved link as a component link of a recommended route. Next, the route search unit 43 examines whether the component link is a departure link on which the departure point exists or to which the departure point is close. When the component link is not a departure link, the route search unit 43 searches for a link (a connection source link) that has caused the component link, determines the retrieved link as a component link, and further examines whether the component link is a departure link. Repeating this processing until it is judged that a component link is a departure link, component links constituting a recommended route are determined.

The total travel time up to the destination can be obtained by searching the heap table 420 for the total travel time 425 up to the end node of the destination link. Further, an expected time of arrival at the destination can be obtained by adding the total travel time 425 to the departure time.

The processing of searching for the recommended route has been described above.

Figure 11A:
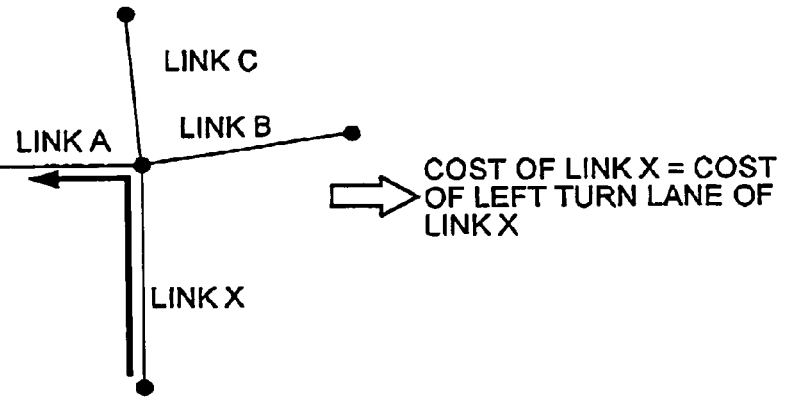
FIG. 11 is a diagram explaining link travel time employed.
Figure 11B:
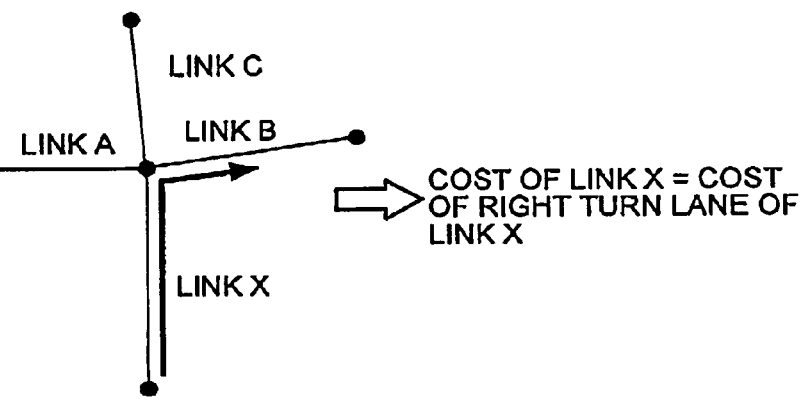
Figure 11C:
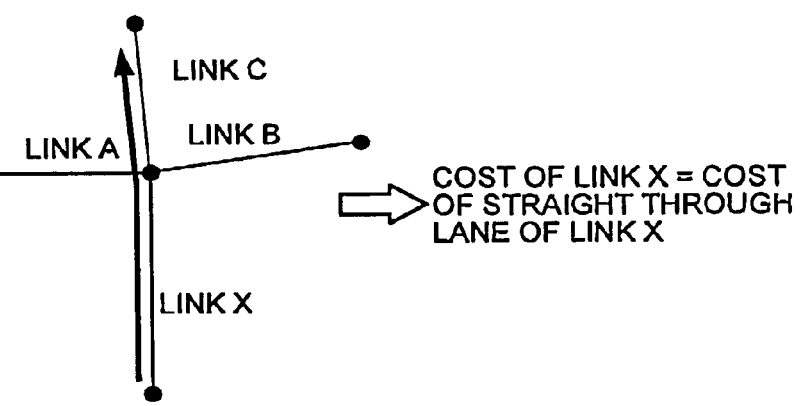

A route search method to which the present invention can be applied is not limited to the above method, and other route search methods can be employed. For example, it is possible to examine all routes connecting the departure point and the destination in presupposed mesh areas, and to search for a route having the shortest total travel time among those examined routes. In this case too, travel time of a lane connected to the next link on a route is used as travel time of a component link of the route. That is to say, as shown in FIG. 11(A), in the case where a vehicle turns left before moving to a next link A, a travel time of the left turn lane is used as a travel time of a link X before the left turn. As shown in FIG. 11(B), in the case where a vehicle turns right before moving to a next link B, a travel time of the right turn lane is used as a travel time of the link X before the right turn. And, as shown in FIG. 11(C), in the case where a vehicle goes straight without turning right and left before moving to a next link C, travel time of the straight through lane is used as travel time of the link X before the next link C.

When the route search unit 43 retrieves a recommended route, the route search unit 43 instructs the route unit 44 to perform route guidance using the retrieved route. Receiving the instruction, the route guidance unit 44 starts the route guidance. The route guidance unit 44, for example, displays the recommended route, the total travel time and the expected arrival time on the display 2, to perform the route guidance.

One embodiment to which the present invention is applied has been described above.

According to the above embodiment, it is possible to search for a recommended route more accurately, considering that traffic conditions are different between lanes.

Further, traffic information collected in the past are statistically processed and used as costs of links. In detail, statistical traffic information corresponding to conditions (date, weather and the like) at the time of passing a link is used as a cost of that link. Thus, it is possible to search for a recommended route in conformity with the real situation.

The present embodiment is different from a route search method that simply considers costs at the time of right and left turns. Sometimes the number of lanes of a road changes irrespective of right and left turns. Further, sometimes the same road has different traffic conditions between lanes. The present embodiment can cope with such actual situations, and can search for a recommended route more accurately.

The present invention is not limited to the above embodiment, and can be variously changed within a scope of the invention.

The above embodiment has been described taking the example where route search is performed using statistical traffic information. However, the route search may be performed using current traffic information received from a traffic information delivery center through the FM multiplex broadcast receiver 12, the beacon receiver 13 or a network. In that case, the current traffic information includes traffic information for each lane. From the traffic information, the route search unit 43 obtains a cost (travel time, vehicle speed or the like) of a link. Route search processing is simpler in comparison with the above case where route search is performed using the statistical traffic information. That is to say, in performing route search employing Dijkstra's algorithm or the like, a cost of a lane on which a vehicle runs to move to the next link is used as a cost of the link of a route (see FIG. 11). A route having the lowest total cost is obtained as the best route to the destination.

Further, it is possible that traffic information for each lane is received through a beacon or an FM multiplex broadcast and stored in a storage unit. The traffic information stored in the storage unit is then used for route searching similarly to the above embodiment.

The invention claimed is:

1. A navigation device, comprising:
a storage unit configured to store link data for links constituting routes on a map, where at least one link has plural lanes including ones of a left-turn lane, a straight-through lane and a right-turn lane, and where the link data: identifies each link using an identifier, associates each respective lane with the identifier of the at least one link to which it belongs, and stores respective costs of the respective lanes; and
a route search unit adapted to search for a route having a lowest total cost to a destination, using said link data, including using the respective costs of the respective lanes.

2. A navigation device according to claim 1, wherein:
said route search unit uses, as a cost of a link on a route, a cost of a lane on which a vehicle runs to move to a next link, such being the cost of one of lanes of the link in question.

3. A navigation device according to claim 2, wherein:
said link data includes cost according to time period; and
said route search unit uses, as a cost of a link on a route, a cost of a time period to which an expected time of arrival at the link belongs.

4. The device of claim 1 or 2, further comprising a receiving unit adapted to receive current traffic information including traffic information for respective lanes of links,
wherein when said storage unit stores cost of respective lanes of links, said cost being obtained from the traffic information received by said receiving unit.

5. The device of claim 1:
wherein costs are statistically processed based on traffic information collected in the past and classified according to a collection condition; and
the route search unit uses, as a cost of a link on a route, a cost of a lane on which a vehicle runs to move to a next link this cost having been classified according to a collection condition corresponding to the situation at the time of arrival at the link in question.

6. The device of claim 5, wherein said collection condition of said traffic information collected in the past is at least one of: type of day, weather and time period.

7. A navigation device comprising:
a storage unit configured to store link data for links constituting routes on a map, where at least one link has plural lanes including ones of a left-turn lane, a straight-through lane and a right-turn lane, and where the link data: identifies each link using an identifier, associates each respective lane with the identifier of the at least one link to which it belongs, and stores respective travel times of the respective lanes;
a route search unit adapted to search for a route to a destination; and
a travel time calculation unit adapted to calculate a total travel time to said destination, by adding travel time of respective links constituting a route to said destination; wherein
said travel time calculation unit uses, as a travel time of a link on a route, a travel time of a lane on which a vehicle runs to move to a next link.

8. A navigation device, comprising:
a storage unit configured to store link data for links constituting routes on a map, where at least one link has plural lanes including ones of a left-turn lane, a straight-through lane and a right-turn lane, and where the link data: identifies each link using an identifier, associates each respective lane with the identifier of the at least one link to which it belongs, and stores respective costs of all respective lanes of the routes; and
a route search unit adapted to search for a route having a lowest total cost to a destination, using said link data, including using the respective costs of the respective lanes.

* * * * *